United States Patent [19]

Browaeys et al.

[11] Patent Number: 4,748,016

[45] Date of Patent: May 31, 1988

[54] PROCESS OF MAKING FINELY DIVIDED POWDERS OF ALKALINE EARTH METAL TITANATES

[75] Inventors: Jean-Philippe Browaeys, Paris; Jean-Francois Colombet, Rueil Malmaison; Patrick Dougier, Andresy; Claude Magnier, Paris; Regis Poisson, Asnieres, all of France

[73] Assignee: Rhone-Poulenc Specialites Chimiques, Courbevoie, France

[21] Appl. No.: 650,710

[22] Filed: Sep. 14, 1984

[30] Foreign Application Priority Data

Sep. 14, 1983 [FR] France ................................ 8314618

[51] Int. Cl.$^4$ .................. C01G 23/08; C04B 35/46
[52] U.S. Cl. .................................. 423/598; 501/136; 501/137
[58] Field of Search ............... 423/598, 639; 501/134, 501/135, 136, 137, 12; 252/62.9

[56] References Cited

U.S. PATENT DOCUMENTS

| | | | |
|---|---|---|---|
| 2,758,911 | 8/1956 | Lynd et al. | 501/136 X |
| 2,964,413 | 12/1960 | Merker | 501/136 OR |
| 3,292,994 | 12/1966 | Kiss et al. | 423/598 OR |
| 3,577,487 | 5/1971 | Sanchez | 264/56 |
| 3,932,313 | 1/1976 | Reynolds et al. | 501/137 X |
| 4,058,592 | 11/1977 | Quets | 501/137 X |
| 4,061,583 | 12/1977 | Murata et al. | 423/598 X |
| 4,257,339 | 3/1981 | Prudhon et al. | 110/346 |
| 4,318,995 | 3/1982 | Rhodes et al. | 501/135 X |
| 4,379,638 | 4/1983 | Prudhon et al. | 366/149 |
| 4,520,004 | 5/1985 | Uedaira et al. | 423/598 OR |
| 4,537,865 | 8/1985 | Okabe et al. | 501/137 X |

FOREIGN PATENT DOCUMENTS 1438057  6/1973  United Kingdom .

OTHER PUBLICATIONS

Encyclopedia of Chemical Technology, vol. 4, pp. 225–231.

*Primary Examiner*—Mark L. Bell
*Assistant Examiner*—Karl Group
*Attorney, Agent, or Firm*—Burns, Doane, Swecker & Mathis

[57] ABSTRACT

Finely divided powders of alkaline earth metal titanates, well suited for the fabrication of, e.g., ceramic resistors and condensers, are facilely prepared by (i) admixing a solution of an alkaline earth metal nitrate with a titanium sol having a pH ranging from 0.8 to 2.5 and which comprises elementary crystallites of $TiO_2$ having particle sizes ranging from 10 to 100 Å, agglomerated into submicronic masses having particle sizes ranging from 200 to 1000 Å, (ii) next drying the suspension which results, (iii) calcining said dried suspension at a temperature ranging from 700° to 1300° C. for from 30 minutes to 24 hours, under a $NO_x$ partial pressure decreasing from 1 to 0, and then (iv) optionally grinding the powder resulting from said step (iii).

10 Claims, 2 Drawing Sheets

PROCESS OF MAKING FINELY DIVIDED POWDERS OF ALKALINE EARTH METAL TITANATES

BACKGROUND OF THE INVENTION

1. Field of the Invention

The present invention relates to the preparation of a finely divided powder of an alkaline earth metal titanate, the titanate thus prepared and the formulation thereof into ceramic compositions used for the manufacture of condensers or resistors therefrom.

2. Description of the Prior Art

The alkaline earth metal titanates, and especially barium titanate, are compounds which are widely used in the preparation of ceramic compositions.

Various methods for the preparation of barium titanate are known. It is prepafed, in particular, by forming a chamotte between a barium salt containing a volatile anion, for example, barium carbonate, and titanium oxide (*Chemical Abstracts,* 20, 166, 870 g). In this case, the reaction takes place at temperatures ranging from 1000° and 1400° C., which gives rise to temperatures upon completion of sintering, during the preparation of the dielectric formulae, higher than 1350° C.

Such a process has many disadvantages.

First, the need to carry out the reaction and sintering at high temperatures entails a considerable consumption of energy.

Furthermore, it is known that in the manufacture of a dielectric composition, in addition to the barium titanate, materials are used which serve to ensure contact between the different layers of titanate forming the dielectric. However, taking account of the fact that the sintering reaction takes place at high temperature, it is necessary to use materials able to withstand these conditions, and therefore having high melting points. In the case of the condensers, for example, this mandates a selection of precious metals such as, for example, silver, platinum and palladium.

SUMMARY OF THE INVENTION

Accordingly, a major object of the present invention is the provision of an improved alkaline earth metal titanate which can be sintered at low temperature, that is to say, having a temperature upon completion of sintering, measured by dilatometry (heating at 5° C./minute), lower than 1350° C., and which thus provides considerable economic advantage in terms of energy and raw material requirements.

Another object of the present invention is the provision of an alkaline earth metal titanate which sinters rapidly, that is to say, the density of which, measured after heating for 2 hours at 1300° C., is greater than or equal to 95% of the theoretical density of the desired titanate. Rapid sintering enables considerable savings in energy and excellent productivity to be obtained.

Still another object of the present invention is the provision of an improved alkaline earth metal titanate in very finely divided powder form, and with excellent reproducibility. This powder, which is uniformly stoichiometric at the microscopic level, is especially well suited for the manufacture of ceramic materials in association with other compounds, by reaction in the solid state.

Briefly, the present invention features the preparation of a fine powder of an alkaline earth metal titinate which includes the following stages:

(i) a titanium sol, having a pH ranging from 0.8 to 2.5 and comprising elementary crystallites of $TiO_2$ of sizes ranging from 10 to 100 Å, agglomerated into submicronic masses of sizes ranging from 200 to 1000 Å, is first mixed with a solution of an alkaline earth metal nitrate;

(ii) drying of the suspension which results is then carried out;

(iii) the dried product is next calcined at a temperature ranging from 700° C. to 1300° C. for a period of time of from 30 minutes to 24 hours, and under a partial pressure of $NO_x$ decreasing from 1 to 0; and (iv) grinding of the powder obtained is thence optionally carried out.

DETAILED DESCRIPTION OF THE INVENTION

Figure 1:
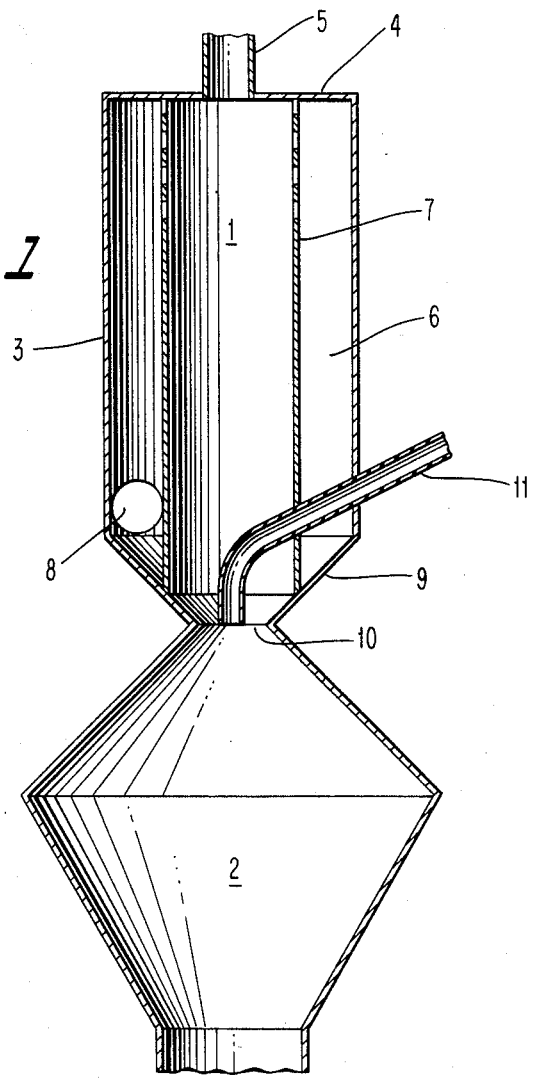
FIG. 1 represents a device for drying the titanium sol suspension according to the invention.

More particularly according to the present invention, the titanium sol having a pH of from 0.8 to 2.5, and preferably from 1.8 to 2.2, and which consists of elementary crystallites of $TiO_2$ having sizes ranging from 10 to 100 Å, agglomerated into submicronic masses having sizes from 200 to 1000 Å, can be readily obtained by any suitable technique and, especially by peptization of a titanium dioxide gel which has the same sizes of elementary crystallites as the desired sol, but which incorporates macroscopic masses on the order of one micron.

In one preferred embodiment of the invention, a titanium dioxide gel is peptized, the size of the elementary crystallites of which is on the order of 50 Å and optionally containing macroscopic masses on the order of 1 micron. This gel is preferably obtained during the conventional process for preparing titanium dioxide by acid attack of ilmenite with sulfuric acid; its sulfate ion content ranges from 3 to 15%, and preferably from 6 to 8%, and its acidity is such that the pH of the aqueous suspension (300 g/l expressed as $TiO_2$) ranges from 1 to 3.

The peptized gel which is composed essentially of water and $TiO_2$ must not have too low a $TiO_2$ concentration, since too great a water content would make the drying of the sol subsequently obtained in the downstream processing more difficult and longer. On the other hand, it is established that too high a $TiO_2$ content can also interfere with the satisfactory progress of the process. A peptized gel which has a $TiO_2$ content of 5 to 35% by weight will preferably be used to begin the process, and according to another embodiment of the invention, a peptized gel having a 15% $TiO_2$ content will be used.

According to the process of the invention, a solution in water of an alkaline earth metal nitrate is then mixed with the sol or suspension obtained by peptization of the gel. The alkaline earth metal is preferably barium, strontium or calcium which are used as a basic alkaline earth element in dielectric compositions for condensers or resistors.

An important parameter during the addition of the alkaline earth metal nitrate is the atomic ratio M/Ti (M representing the alkaline earth metal). It has been determined that suitability for sintering of the titanate obtained by the process of the invention especially depends upon this ratio.

It was observed that, for values of the atomic ratio M/Ti less than 0.96 and greater than 1.05, satisfactory densification of the alkaline earth metal titanate powder was not obtained. In contrast, for values of the ratio M/Ti ranging from 0.96 to 1.05, the density measured at 1300° C. after heating the alkaline earth metal titanate powder for 2 hours is well above, or equal to, 95% of the theoretical value. Nevertheless, within this latter range, it is preferable to operate using an M/Ti ratio of from 0.96 to 1, to obtain a temperature upon completion of sintering (measured by dilatometry; heating at 5° C./minute) as low as possible. In fact, with a ratio ranging from 1 to 1.05, the temperature upon completion of sintering of the alkaline earth metal titanate can be equal to 1350° C., measured by dilatometry (heating at 5° C./minute), or can even slightly exceed this value.

At termination of the stage of introduction of the alkaline earth metal nitrate solution, a perfectly homogeneous suspension of the titanium in the alkaline earth metal solution is obtained.

The suspension thus obtained contains approximately 5 to 15% of dry solids. The solution must then be dried.

This drying may be carried out by any known means, especially by atomization, namely, by spraying the solution in a hot atmosphere.

This drying is carried out preferably in a flash reactor, perfected by the assignee hereof. In this case, the gases are propelled in a helical movement and flow into a vortex well. The suspension is injected on a trajectory which merges with the axis of symmetry of the helical trajectories of the gases, which enables the momentum of the gases to be transferred completely to the particles of this suspension. Furthermore, the retention time of the particles in the reactor is extremely short, less than 1/10 second, which eliminates any risk of overheating through excessively long contact with the gases.

According to the respective flow rates of the gases and of the suspension, the inflow temperature of the gases ranges from 400° to 700° C., and the temperature of the dried solids from 120° to 160° C.

A dry product is obtained which has a particle size on the order of several microns, for example, of from 1 to 10 microns.

The flash reactor device according to FIG. 1 consists of combustion chamber 1 and contact chamber 2.

Chamber 1 consists of casing 3 closed on top by plate 4 in which there is a space provided for mounting pulverization device 5.

The combustion chamber has annulus 6 defined on the inside by cylinder 7 having perforations or holes through its upstream portion.

A gaseous phase is introduced tangentially through inlet opening 8 into annulus 6.

The downstream end of the casing 3 is formed with walls 9 that converge to a confined passage 10, in which, along the rotation axis of chamber 1, elbow pipe 11 exits perceptibly at the level of the section of the confined passage.

Contact chamber 2 is composed of a bicone, its upstream divergent-shaped part extending the converging end portion of chamber 1.

The helicoidal phase is composed of the gaseous phase, generally ambient air introduced through inlet 8, but is of course understood that this type of implementation is in no way limited.

The substance to be treated is introduced in liquid form, axially at the end of the combustion zone 1. The introduction rate is slow, approximately 0.03 to 10 m/sec.

In this way, the symmetric helicoidal flow disintegrates the liquid jet from pipe 11 by the described transfer of momentum.

In this way, it is possible to treat liquid substances easily at high temperatures because it prevents the products from touching the walls and bringing these walls to the treatment temperature.

The gases at the outlet of the combustion zone can be brought, without difficulty, to temperatures of between 900° to 1200° C., and this furthermore allows the material to be treated to be introduced at ambient temperature.

To form the helical heated gas at passage 10, the gaseous phase is advantageously introduced under low pressure at pipe 8, less than one bar, and preferably between 0.2 and 0.5 bar above the pressure prevalent downstream in the contact zone; the velocity is generally between 10 and 100 m/s, and preferably between 30 and 60 m/s (meters/sec).

The injection rate of the combustible substance reacting with the gaseous phase can reach velocities of approximately 100 and 150 m/sec. upon exiting pipe 5.

According to one of the designs of the present invention, the reaction zone is formed of a combustion zone. The axial combustible phase from pipe 5 entering this reaction zone is composed of a carbonaceous phase like fuel, for example, or any other combustible material which is injected through the inlet of said zone and along the symmetrical axis of the helicoidal current.

The inner wall 7 is perforated lengthwise dependent upon calorie output and gas temperatures.

This perforated wall 7 has holes which are usually circular and which must be "thin walled" at least on the side of the closed end of the apparatus, i.e., the ratio of the diameter of the holes to the wall thickness must be more than 5, the minimum wall thickness being limited only by mechanical requirements. There are at least 6 of them and they are distributed on at least one circle, but preferably on several axially spaced circles of the cylindrical wall. Most of the holes are arranged on the upstream side of the apparatus to help mix the substances to be put into contact and to ensure preheating of part of these substances, while protecting the inner walls from the heat effects of the reaction. The total surface-area of the holes possibly located on the downstream side can be very small, from 1/10 to 1/100 of the total surface-area of the holes.

If $D_1$ is the average internal diameter of the external casing 3 and $D_2$ that of the perforated wall 7, half $D_1-D_2$ is preferably from 1 to 10 cm according to the flow rate of the helical stream. The diameter $D_2$ is preferably determined as a function of the total amount of heat liberated in the reaction and is from 0.4 to 0.5 $\sqrt{k}$ mm, k being the number of kilocalories liberated per hour when the combustible substance is burnt or in general by the reaction brought about. $D_2$ should not be less than 500 mm in cases where a viscous reagent, e.g., a heavy fuel, is introduced in the straight stream, and this reagent should preferably be dispersed finely and homogeneously.

The gaseous current subsequently put into rotation is brought in through a tangential inlet pipe 8. The conditions for the section of this inlet are above all dependent upon construction requirements and the concern over not having this means cause excessive pressure losses. As previously stated, a relative pressure of 0.2 bar is usually sufficient. The opening connecting this inlet and the annular jacket 7 is preferably close to the downstream end of this reaction chamber.

The combustible substance is ignited by a conventional means, such as a spark plug, with a spark flashing between its electrodes. The plug may be mounted on a retractable device comprising e.g. a metal bellows. The spark is produced in a region where the combustible substance and the combustion-supporting substance are in contact, then the lighting means can be withdrawn to the level of the perforated wall. It is obviously also possible to ignite the mixture or to initiate the action with a flame.

Due to the above-mentioned advantage concerning the temperature of the walls, it is possible to make the apparatus of ordinary steel. There is no point in using stainless steel or other corrosion-resistant metals except when the presence of any oxide dust has to be avoided. It is quite unnecessary to provide refractories.

Fireproofing is useless.

The fuel can be a gas such as methane or propane for example, or another light hydrocarbon, liquid residues to be destroyed by combustion with possibly tar or soot in suspension, or a solid body at ambient temperature and melted before being injected, sulfur for example. Other bodies of every diverse natures can also be injected.

Different types of combustion chambers can also be used.

In particular, a torrid annulus equipped with a detachable mechanically independent divider or perforated casing as well as a cylindrical casing and truncated and perforated casing with a downstream tangential inlet and perforations located upstream can be used.

The momentum peculiar to the helicoidal flow as compared to that of the liquids in axial flow must be high, in a ratio of at least 100 and preferably between 1000 and 10,000 times. Under these conditions, the movement proper of the gases is then imposed in its direction and intensity to the liquid droplets isolated from each other in the convergence zone of the two currents. The velocity of the liquids is furthermore reduced close to the minimum allowing for their continuous flow and under these conditions, the velocity of the gases can remain rather low so as not to require strong pressure.

The ratio of the liquid and gas masses is obviously chosen as a function of several factors, for example, the temperature of these fluids and of the final operation to be carried out, for example, vaporization of the liquid.

The velocities and consequently the momentum at the level of the confined passage are calculated simply according to the fluid input flow rates and the section of this passage, pressure having little to do with it. The axial current is considered rectilinear and of a section equal to that of the inside of its pipe, whether it emerges or not from the confined passage.

The paths imposed by the gases at the outlet 10 of the constricted zone form one of the two families of generating lines of a "one sheet hyperboloid", or more specifically, a laminated whole of several hyperboloids. These generating lines constitute helicoidal currents and lean on a family of circles, or a ring (said "gorge circle" of the hyperboloid) of small width located downstream near of the confined passage before spreading out in divergent directions. This ring surrounds a reduced pressure zone the effect of which manifests itself upstream on the liquid constituting the rectilinear current and downstream on the gases by having a fraction of these mixed fluids recycled. The liquids are fractioned into a multitude of droplets, each one taken over by a certain volume of gas and subjected to movement creating a centrifugal effect; this improves contact with the vector gas and when combustion takes place, it ensures the ignition and stability of the flame.

The ratio of the gas flow rate on the liquid flow rate may vary in large proportions; an increase of this ratio decreases the size of the droplets formed.

In these operations, the current subjected to the swirling movement is generally a gas or a vapor possibly transporting in suspension solids or liquids to be put in contact with substances introduced axially. A pressure of a few hundred grams per square centimeter (from 200 and 500 g/cm$^2$) above the pressure prevalent in the part of the equipment located downstream suffices to ensure good operation of the device. The swirling movement caused by the current creates, as indicated, a slight reduction in pressure in its axial portion, so that a fluid flow can occur in the inner tubular casing without it being necessary to exert pressure on this fluid.

The contact device 2 can be very simply composed of a bicone or truncated cone.

Then the phase or phases to be heated can advantageously be introduced by pipe 11 at the level of the confined passage at a distance from the circle of the smallest section comprised in the interval of more or less one radius with respect to the plane of this circle.

Advantageously, the outside diameter of the supply pipe is at least equal to $\frac{1}{4}$ the diameter of this circle, and preferably equal to at least $\frac{2}{3}$ of this diameter.

In order not to disturb the reaction occurring in the first chamber, the substance (or substances) to be treated is fed in simply through a tubular elbow, but other devices such as an annular injector located in the plane of the confined passage can be used.

Figure 2:
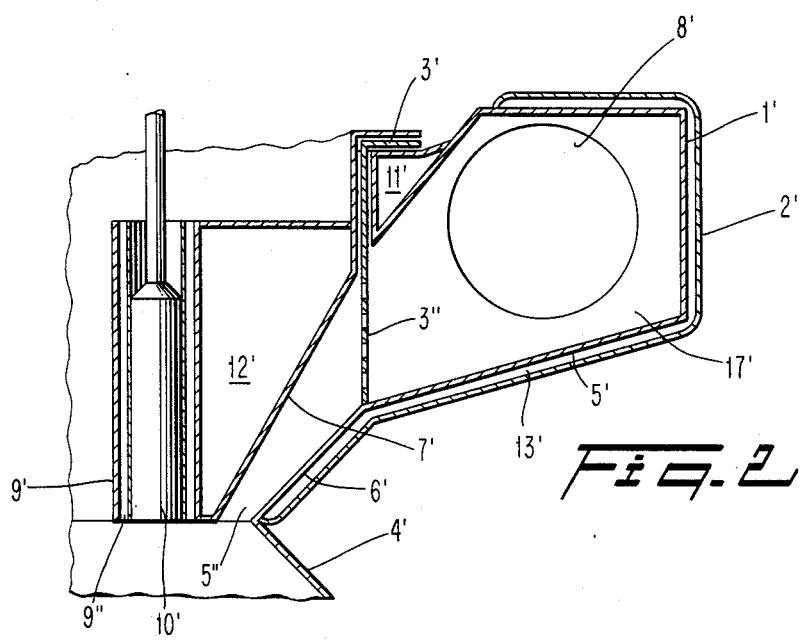
FIGS. 2, 3, 4 and 5 represent alternative helical flow chambers for use in the drying device of FIG. 1.
Figure 3:
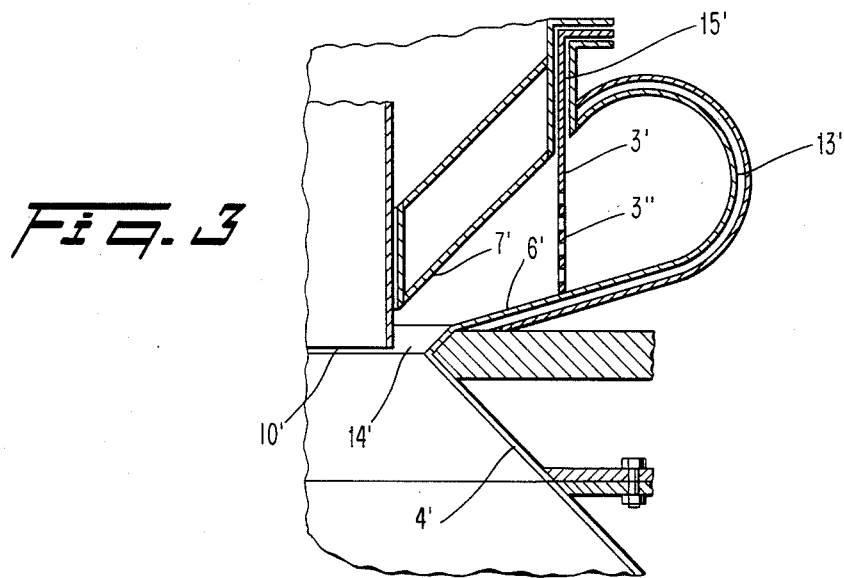

FIGS. 2 and 3 represent alternative means for introducing and contacting the hot helical gas flow with the axial liquid flow.

In FIG. 2 the rigid element containing the helicoidal phase is composed of rigid double jacket 1' and 2', extended downstream by a bicone, represented here only by the most upstream part 4'.

This continuous jacket has in its most upstream part a large annular cavity extended by an annulus defined by the two truncated cones 6' and 7' converging downstream.

The supply of the helicoidal phase is ensured through tangential pipe 8'.

The formation of the symmetric helicoidal flow is ensured by divider 3' which is detachable from and mechanically independent of rigid element 1'.

In addition, two other cooling jackets 12' are provided between cone 7' and pipe 9', and 11'.

The axial phase is brought in through tubular pipe 9'; according to this form of design, there is rod 10' provided inside pipe 9'.

The device in FIG. 2 has an over-all diameter of 1210 mm; the divider cylinder has 5 rows of orifices from 360 20.

FIG. 3 represents another form of design according to which the rigid element is made up of jacket 13' open only at its downstream part 14' made up of a continuous curve and cut by divider element 15'.

The suspension to be dried is introduced axially through pipe 9' and the drying air tangentially through pipe 9'.

In operation, the helical phase is introduced through the tangential inlet from supply pipe 8' for helicoidal flow through the circular housing 17' to the restricted outlet opening 5", defined by the two truncated cones 4' and 6', which define divergent conical sections. The formation of the helicoidal phase in symmetrical helicoidal flow is enhanced by the cylindrical divider 3', which defines an element of revolution with respect to the symmetry axis of the axial pipe 9', and is provided with orifices 3' through which the helicoidal stream flows. The liquid or semi-liquid is introduced through the tubular pipe 9' for axial flow through the annular space 9" about rod 10' to the outlet opening at the level of the limited passage.

A heat exchange liquid is circulated through the double jacket formed by walls 1'-2' to cool the walls of the element of revolution through which the helicoidal phase is circulated. This represents a conventional cooling system through which a cooling liquid such as water is circulated about the outer part of the double jacket.

Figure 4:
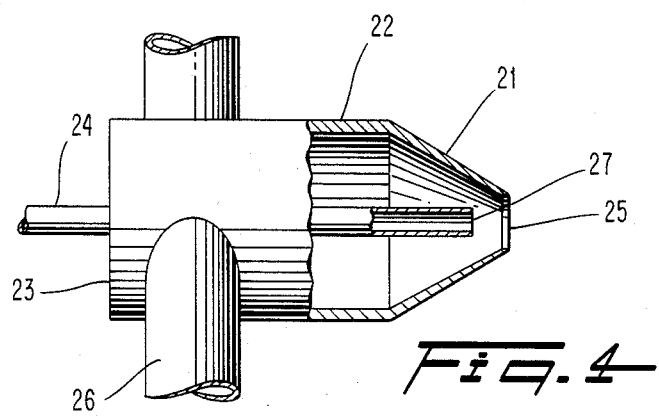
Figure 5:
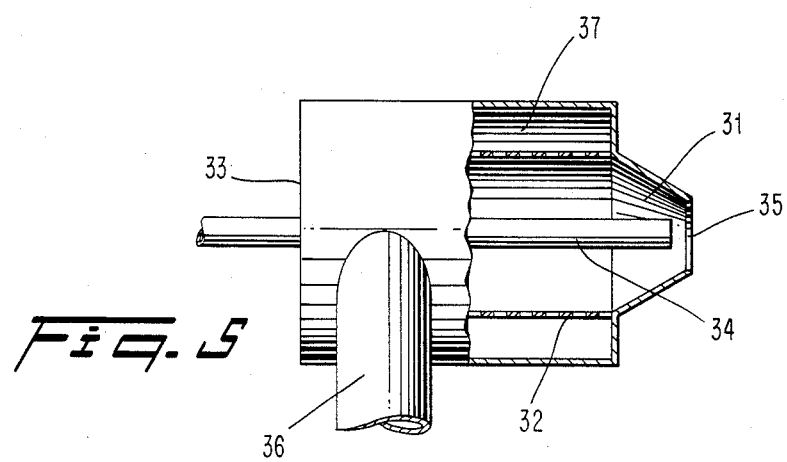

FIGS. 4 and 5 represent two further alternative embodiments for contacting a helical hot gaseous phase with an axial liquid phase.

FIG. 4 comprises a frustoconical portion 21, a cylindrical section 22, a tangential pipe 26, and a planar (or end) wall 23 at the center of which is disposed a pipe 24, having a mouth 27, for introducing a part of the substances which are to be brought into contact. The pipe 24 passes into the cylindrical casing along the axis thereof and extends into the frustoconical portion 21, up to a certain distance from the small base referred to as the mouth 25 of the device of the frustoconical portion 21.

The embodiment shown in FIG. 5 is an alternative form which makes it possible to use only a single tangential pipe, while producing a regular swirl movement. References 31, 32 and 33, respectively denote the frustoconical and cylindrical portion and the end of the casing tube, while references 34, 35 and 36, respectively denote the axial pipe, the mouth of the device and the tangential pipe. In this embodiment the cylindrical part 32 is perforated and is surrounded by a casing 37 into which the tangential pipe 36 opens.

The dry product is then calcined.

The calcination is performed at a temperature of from 700° to 1300° C., and preferably from 1000° to 1150° C. The duration of the calcination can vary from 30 minutes to 24 hours, for example, and preferably ranges from 6 to 15 hours.

According to the invention, the calcination is conducted in an atmosphere of nitrogen oxide $NO_x$ ($1 \leq x \leq 2$) such that the partial pressure of $NO_x$ decreases during the calcination from 1 to 0. In a particularly preferred embodiment of the invention, the calcination is performed in an atmosphere of $NO_x$ and air such that the partial pressure of $NO_x$ decreases during the calcination of from 1 to 0, by carrying out a gradual flushing with air for approximately 10 to 30 minutes when the desired temperature of calcination has been reached.

Following this calcination, an alkaline earth metal titanate powder is obtained which has a macroscopic particle size of from about 1 to 10 microns, the 1 to 10 micron particles consisting of elementary crystallites or submicronic masses of size from about 500 Å to 8000 Å.

The products which are obtained at a calcination temperature below approximately 1050° C. can be directly used for the manufacture of dielectric formulae. In contrast, the products obtained at a calcination temperature above or equal to approximately 1050° C. typically must be ground to obtain usable powders consisting of elementary crystallites having particle sizes which range from 2000 to 8000 Å and preferably from 2000 to 3000 Å. The particle size distribution of the powder then ranges from approximately 0.5 to 3 microns.

The changing of the temperature and calcination time, the latter being correlated with the dimension of the particles, permits the following trends to be elucidated: the lower the temperature of calcination, the more the calcination time must be increased; the higher the calcination temperature, the more the time can be reduced.

The characteristics of the alkaline earth metal titanate powder are determined in the following manner:

The alkaline earth metal titanate powder is mixed with a binding agent in the proportion of 2% by weight, this binding agent being selected from among the binding agents well known for this purpose, for example, Rhodoviol 4/20$^R$.

The mixture is pelletted under a pressure of 2t/cm$^2$. Sintering is then performed. Sintering typically begins at about 800° C. A dilatometric measurement is carried out and the so-called temperature "upon completion of sintering" recorded is that measured upon completion of the mechanical contraction.

The alkaline earth metal titanate powders obtained according to the invention possess notably useful properties. In fact, their temperatures upon completion of sintering (measured by dilatometry; heating at 5° C./minute) are below 1350° C., they hence sinter at low temperature but, moreover, they sinter very rapidly since their density measured at 1300° C. after heating for 2 hours is greater than or equal to 95% of the theoretical density of the alkaline earth metal titanate in question.

The powders of alkaline earth metal titanate according to the invention are useful in the manufacture of condensers and resistors according to processes and in formulations well known to these fields.

In order to further illustrate the present invention and the advantages thereof, the following specific examples are given, it being understood that same are intended only as illustrative and in nowise limitative.

EXAMPLE 1

1066 g of a titanium sol containing 15% by weight of $TiO_2$ were used as the starting material. The pH of the suspension was 2. The suspension obtained consisted of submicronic masses of approximately 400 Å formed from elementary crystallites of approximately 50 Å. The titanium "sol" was then mixed with 6534 g of a $Ba(NO_3)_2$ solution containing 8% of $Ba(NO_3)_2$ by weight (ratio Ba/Ti=1).

After being homogenized by stirring for 15 minutes, the mixture was dried by spraying.

The drying was carried out in the flash reactor described in French Pat. Nos. 2,257,326, 2,419,754 and 2,431,321. The inflow temperature of the gases was 550° C., and the drying temperature was 150° C.

718 g of dried product were then obtained. Same consisted of spherical agglomerates having particle sizes ranging from 1 to 10 μm.

The dried product was calcined at 1150° C. for 6 hours. The rate of temperature rise was 9° C. per minute. The $NO_x$ calcination atmosphere was gradually removed by flushing with air once the temperature plateau had been reached (time for elimination of the $NO_x$: 20 minutes). 466 g of $BaTiO_3$ were then obtained. This product barium titanate was next ground. The particle size distribution (Coulter) then ranged from 0.5 to 3 μm.

The size of the elementary crystallites ranged from to 2000 to 5000 Å.

The sintering of the barium titanate was carried out after dry pelleting under a pressure of 2 t/cm². Sintering began in the region of 700° C. and ended at 1270° C. (temperature rise: 5° C./minute). The density after sintering at 1300° C. for 2 hours was equal to 96% of the theoretical density.

EXAMPLE 2

The second test consisted of calcining the dried product described in Example 1 at 1050° C. for 6 hours. The rate of temperature rise and the reaction atmosphere were identical.

The calcined product was ground and then pelleted under the same conditions. Sintering began in the region of 700° C. and ended at 1240° C. The density after sintering at 1300° C. for 2 hours was equal to 96% of the theoretical density.

EXAMPLE 3

The conditions for preparation of the dry product were identical to those of Example 1 except regards the quantity of the barium nitrate solution. Thus, 6272.6 g of Ba(NOhd 3)2 solution containing 8% of $Ba(NO_3)_2$ (ratio Ba/Ti=0.96) were mixed with the titanium "sol" (quantity of Example 1).

The calcination, grinding and sintering conditions were identical to those of Example 2.

Sintering began in the region of 800° C. and ended at 1240° C.

The density after sintering at 1300° C. for 2 hours was equal to 95% of the theoretical density.

EXAMPLE 4

The conditions for preparation of the dry product were identical to those of Example 1, except as regards the quantity of the barium nitrate solution.

Thus, 6664.68 g of $Ba(NO_3)_2$ solution containing 8% of $Ba(NO_3)_2$ (ratio Ba/Ti=1.02) were mixed with the titanium "sol" (quantity of Example 1).

The calcination, grinding and sintering conditions were identical to those of Example 2.

Sintering began in the region of 700° C. and ended at 1350° C.

The density after sintering at 1300° C. for 2 hours was equal to 97% of the theoretical density.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of finely divided alkaline earth metal titanate powder, comprising (i) admixing a solution of an alkaline earth metal nitrate with a titanium sol having a pH ranging from 0.8 to 2.5 and which comprises elementary crystallites of $TiO_2$ having particle sizes ranging from 10 to 100 Å, agglomerated into submicronic masses having particle sizes ranging from 200 to 1000 Å, to form a suspension, (ii) establishing a helical flow of gas in a reactor at a temperature ranging from 400° to 700° C. and allowing the gas to flow into a vortex well, (iii) injecting the suspension along the axis of symmetry of the helical flow of gases into the vortex well assuring drying of the suspension, the retention time of the suspension in the reactor being less than 1/10 of a second with the temperature of the exiting dried solids ranging from 120° to 160° C., (iv) calcining said dried suspension at a temperature ranging from 700° to 1300° C. for from 30 minutes to 24 hours, under a $NO_x$ partial pressure decreasing from 1 to 0, and thence optionally grinding the powder resulting from said step (iv).

2. The process as defined by Claim 1, wherein the step (i) the atomic ratio M/Ti, wherein M is an alkaline earth metal, ranges from 0.96 to 1.05.

3. The process as defined by claim 2, said atomic ratio ranging from 0.96 to 1.

4. The process as defined by claim 1, wherein the step (iii) the decreasing of the $NO_x$ partial pressure is carried out by gradual flushing with air.

5. The process as defined by claim 1, wherein the step (i) said titanium sol has a pH ranging from 1.8 to 2.2.

6. The process as defined by claim 1, wherein the step (i) said titanium sol is prepared by peptization of a titanium dioxide gel.

7. The process as defined by claim 6, said peptized gel comprises water and from 5 to 35% by weight of titanium dioxide.

8. The process as defined by claim 1, wherein the alkaline earth metal comprising said nitrate is barium, strontium or calcium.

9. The process as defined by claim 1, further comprising sintering a shaped article comprised of said finely divided alkaline earth metal titanate powder.

10. The process as defined by claim 1, wherein suspension resulting from said step (i) comprises from about 5 to 15% by weight of dry solids.

* * * * *